United States Patent [19]

Hjortzberg

[11] 4,005,473
[45] Jan. 25, 1977

[54] METHOD AND APPARATUS FOR SYNCHRONIZING RECORD AND PLAYBACK OF VIDEO SIGNALS

[75] Inventor: Bernhard A. Hjortzberg, Mission Viejo, Calif.

[73] Assignee: BASF Aktiengesellschaft, Ludwigshafen (Rhine), Germany

[22] Filed: Apr. 25, 1975

[21] Appl. No.: 571,705

[52] U.S. Cl. .................................. 358/4
[51] Int. Cl.² ................... H04N 9/46; H04N 5/76
[58] Field of Search .......................... 358/4, 8, 19

[56] References Cited
UNITED STATES PATENTS

| | | | |
|---|---|---|---|
| 3,255,303 | 6/1966 | Kihara | 358/4 |
| 3,659,040 | 4/1972 | Fujita | 358/8 |
| 3,729,579 | 4/1973 | De Boer | 358/4 |
| 3,821,788 | 6/1974 | Kobayashi | 358/19 |

*Primary Examiner*—John C. Martin
*Assistant Examiner*—Mitchell Saffian
*Attorney, Agent, or Firm*—Johnston, Keil, Thompson & Shurtleff

[57] ABSTRACT

Methods and apparatus for the encoding with synchronization information of video signals to be recorded and for subsequently decoding the signals in a synchronous manner. A standard broadcast format video signal is stripped of its sync signal and separated into its luminance and chrominance components. Additional sync or chroma identifying information for decoding purposes is added in the blanking period between each horizontal sync pulse and each subsequent picture signal information. The chrominance signals and added sync information are processed by a two-stage modulation network, added to the luminance signal and recorded. Upon playback, the encoded signal is decoded by a two-stage demodulation network which utilizes the added sync information to achieve synchronization. Time base-error correction is also effected by comparing a known frequency with a reconstituted carrier frequency taken from the encoded video signal and adjusting the replay speed or the time delay of decoding in dependence upon the frequency difference.

13 Claims, 4 Drawing Figures

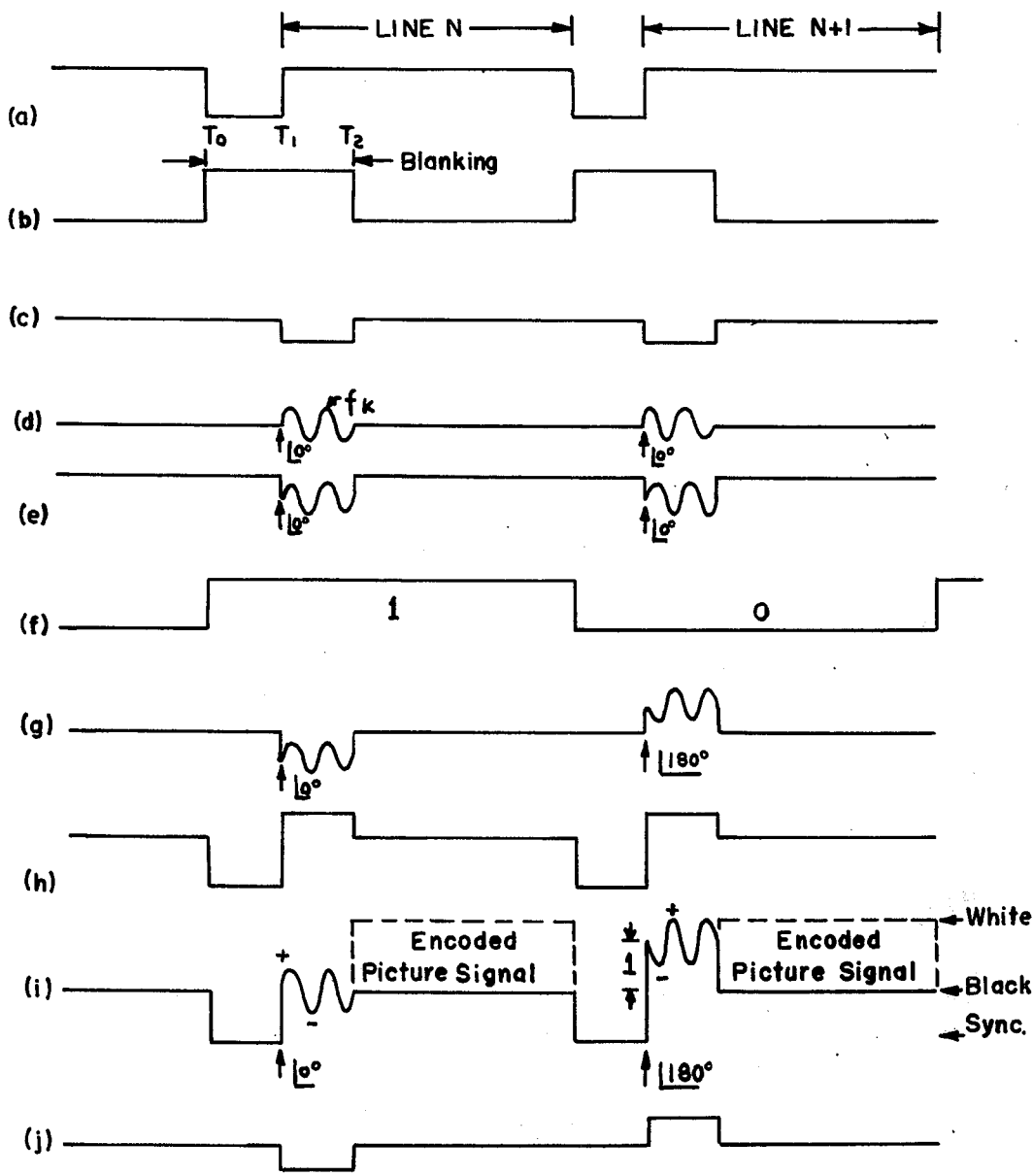

METHOD AND APPARATUS FOR SYNCHRONIZING RECORD AND PLAYBACK OF VIDEO SIGNALS

BACKGROUND OF THE INVENTION

Many methods for providing synchronization information during the encoding of color video signals are known in the art, most widely used of which are those of the standard broadcast formats such as National Televsion Systems Committee (NTSC) or Phase Alternate Lines (PAL). A number of problems--the most significant of which are detailed in my copending application Ser. No. 515,148, filed Oct. 16, 1974, now abandoned, and its continuation-in-part application Serial No. 571,706 filed on even date herewith, arise when such standard formats are used for video recording. In order to achieve more reliable video recording, there have been presented in my above noted copending applications an improved method, circuits and the like for hybrid sequential and carrier encoded color television signal transmission. The present application entails disclosure of an improved method, apparatus and recording medium for providing synchronization information in the encoded video signal which will permit much more reliable decoding of the signal.

OBJECTS AND SUMMARY OF THE INVENTION

It is accordingly an object of the present invention to provide an improved method of encoding a color video signal for subsequent transmission or recording.

It is another object of this invention to provide an improved method of encoding a color video signal with synchronization information embodied therein.

It is still another object of the invention to provide a method for the reliable, synchronous decoding of the foregoing encoded video signal in the reception or playback of this signal.

It is yet another object of the invention to provide apparatus for the carrying out of the disclosed methods, as well as an information storage medium on which a color video signal encoded in accordance with the principles of the present invention has been recorded.

In my copending application Ser. No. 515,148, filed Oct. 16, 1974, and in its continuation-in-part application Ser. No. 571,706, filed on even date herewith, on Hybrid Sequential and Carrier Encoded color Television Transmission Method and Circuits, there has been described a video signal processing system employing the following processing steps: the color video signal is separated and demodulated into its component signals of luminance information and chrominance information; from the component signals an encoded signal having a bandwidth of not more than approximately 3MHz is produced such that one half of the sum of two successive horizontal scan lines of information equals the luminance information of the color video signal and one half of the difference of two successive horizontal scan lines of information equals the chrominance information of the color video signal, with the chrominance information being represented by a first chrominance signal and a second chrominance signal which are contained in two non-overlapping frequency regions; and eventually the processed luminance and chrominance signals are combined prior to transmitting or recording of the encoded signal. Briefly, the present invention, in one aspect thereof, addresses itself to the provision of techniques for adding synchronization information to the above encoded signal and, conversely, to the provision of synchronous decoding techniques utilizing this added information.

More particularly, according to the invention, the horizontal sync signal is separated from the color video signal; an indicating signal is generated under the control of the separated horizontal sync signal; the indicating signal is combined with each of the above mentioned luminance and chrominance signals; and, prior to the recording of the processed luminance and chrominance signals, at least one of the chrominance signals as combined with the indicating signal, is amplitude modulated.

Preferably the indicating signal is an indicating pulse occurring, separate from the horizontal sync signal, within the horizontal blanking interval; and the last mentioned amplitude modulation is carried out by modulating the indicating pulse with a carrier signal, thereby to produce a burst-like signal. This burst-like signal is transmitted or recorded along with the encoded picture signal and is used to facilitate synchronous decoding in reception or playback.

BRIEF DESCRIPTION OF THE DRAWINGS

FIG. 1A illustrates a portion of the synchronizing circuitry, which is used in common with the encoding circuit, FIG. 1, and the decoding circuit, FIG. 2, listed in the next paragraph:

FIG. 3 illustrates the various waveforms of sync signals appearing at given points in the circuits of FIGS. 1, 1A and 2.

DESCRIPTION OF THE PREFERRED EMBODIMENTS

With reference to the above-listed drawings, an embodiment of the invention will now be described in detail in which the invention has been applied, more specifically, to the second example disclosed in the above-referenced continuation-in-part application. In this second example of the copending application a system of the kind in question has been disclosed using a two-stage modulation network wherein the second chrominance signal modulates a suppressed carrier; the resulting amplitude modulated signal is added to the first chrominance signal; and the sum is then employed to amplitude modulate a suppressed carrier formed by a polarity-reversing pulse.

Figure 1:
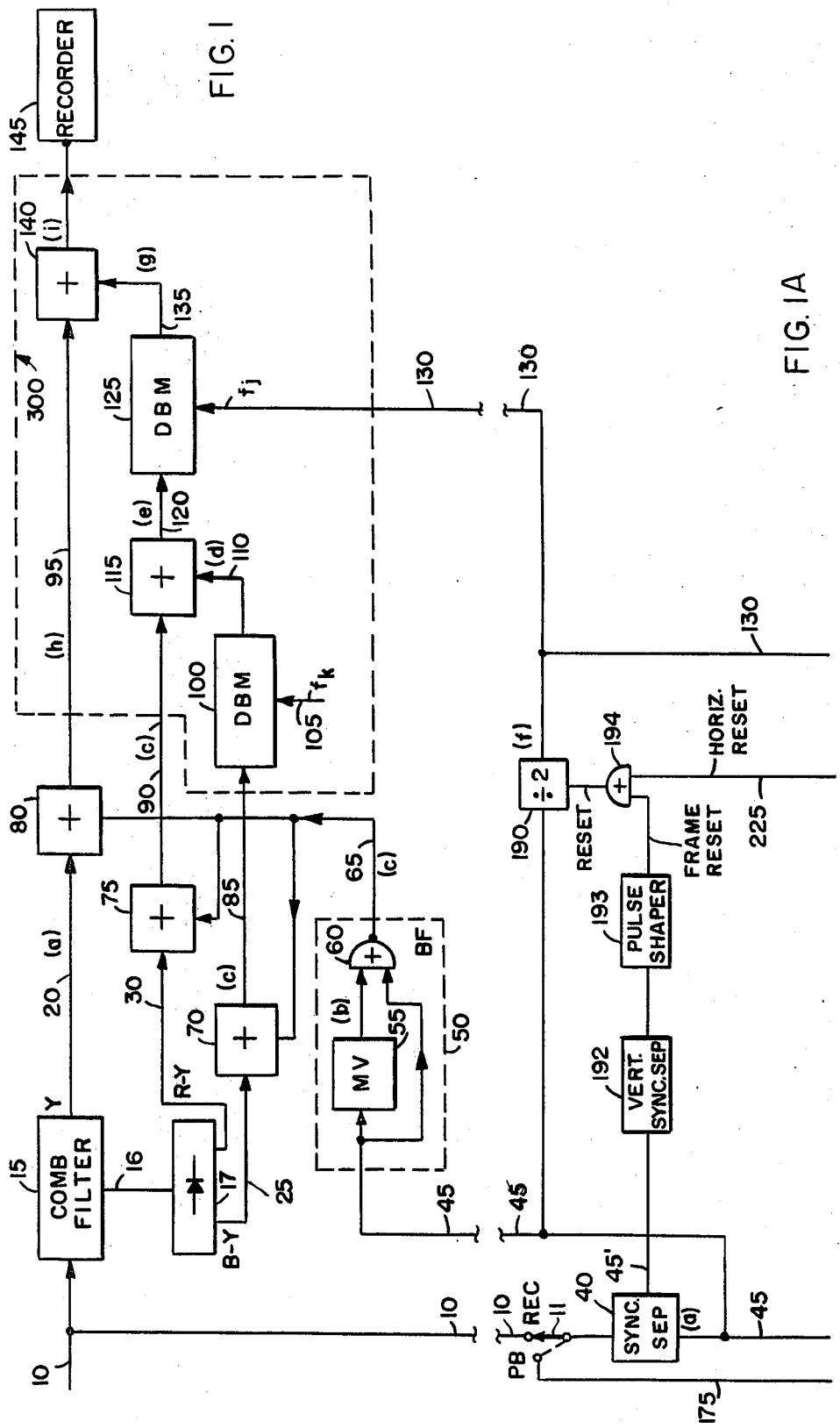
FIG. 1 illustrates a circuit for encoding a video signal with synchronization information.

Referring now to FIG. 1, as supplemented by FIG. 1A, there is disclosed therein a circuit for separating the component parts of a conventional video signal and re-encoding the signal with synchronization information for subsequent recording. A standard broadcast format video signal, such as NTSC or PAL, enters the circuit at line 10 and is broken into its component parts by a conventional comb filter 15 and a demodulator 17. The color video signal is separated by comb filter 15 into luminance information, Y, at a first output 20 of the comb filter and into chrominance information at the second output 16 of this filter. This chrominance information is fed to the input of demodulator 17 which yields at its outputs 30 and 25 the first chrominance component in the form of demodulated color difference signal R-Y and the second chrominance component in the form of demodulated color difference signal B-Y, respectively.

With record-playback switch 11, FIG. 1A, placed in its REC position, the video signal on line 10 also enters a conventional sync separator 40 which strips the horizontal sync pulses of frequency $f_H$ from the video signal and gives an output signal (a) on line 45 as shown in FIG. 3. Preceding each horizontal line N, N+1, there is a horizontal sync pulse of period $T_1$-$T_0$(FIG. 3). Signal (a) then goes to a burst-flag-generator 50, FIG. 1, which consists of a one-shot multivibrator 55 and an inverting AND gate 60. The multivibrator has a period $T_2$-$T_0$ corresponding to the blanking interval and is triggered by each incoming horizontal sync pulse, giving an output signal (b). The AND gate 60 provides a signal (c), herein referred to as an indicating pulse, on line 65. Three conventional adders 70, 75 and 80 then sum the indicating signal (c)--or, in the case of adder 80, (c) inverted--with the B-Y, R-Y and Y signals, respectively. It is to be noted that the indicating pulses are introduced in the time, $T_1$-$T_2$, between the horizontal sync pulses and the encoded picture signal; since this time falls within the blanking interval they do not interfere with information appearing in the original video signal. For convenience in describing the present invention, the outputs of adders 70 and 75 are given as signals (c). It is to be understood, however, that chroma information is present in the signals on lines 85 and 90 which is unimportant to the synchronization scheme. The signal on line 95 more particularly described hereinbelow is likewise given in simplified form as signal (h).

The dashed lines 300 on the right side of FIG. 1 enclose the components which comprise an encoder similar to that disclosed in FIG. 4 of my aforementioned copending application Ser. No. 571,706, filed on even date herewith. The signal on line 85 of FIG. 1 of the present disclosure is modulated in dependence upon a carrier $f_k$ (line 105) by a double balanced modulator 100. Carrier $f_k$ is a selected multiple of the horizontal sync frequency $f_H$ and is chosen in accordance with the disclosure of the just-noted copending application. The synchronization signals appearing at output line 110 of modulator 100 are given as waveform (d) of FIG. 3. As shown by this waveform (d), each pedestal-like period of waveform (c) is transformed, after modulation, to a corresponding burst of frequency $f_k$ which has an initial phase angle of zero degrees at time $T_1$. Adder 115, FIG. 1, sums sync signals (c) and (d) to give a composite sync signal (e) on line 120. This composite signal (e) merely has the position of each burst shifted in the direction of negative amplitude as shown in FIG. 3. Signal (e) is then modulated in dependence upon a second carrier or polarity reversing pulse $f_j$, illustrated as waveform (f) of FIG. 3, by double balanced modulator 125. It can be seen that frequency $f_j$ is at one-half the horizontal frequency $f_H$ and serves simply to invert alternate sync pulses of waveform (e) when modulation is effected.

Figure 2:
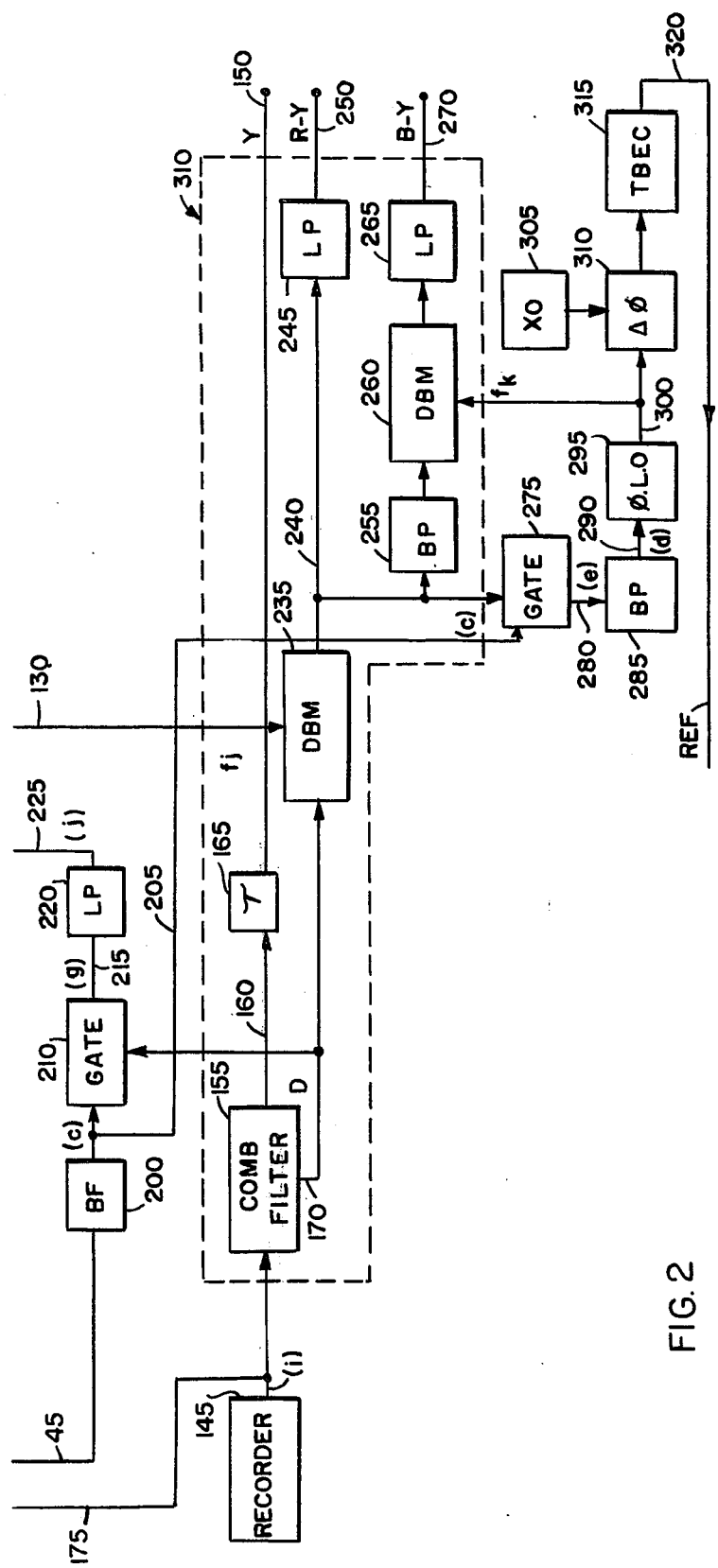
FIG. 2 illustrates a circuit for synchronously decoding the video signal produced by the circuit of FIG. 1.

As shown in FIG. 1A which, as mentioned, illustrates circuitry common to both the encoding circuit, FIG. 1, and the decoding circuit, FIG. 2, the polarity reversing pulse $f_j$ (waveform f) is obtained from output 130 of a divider-by-two 190 the principal input of which is connected to output 45 of sync separator 40.

Divider-by-two 190 has another input on which a reset pulse is impressed which serves to insure the proper phase for polarity reversing pulse $f_j$. The reset pulse is obtained from the output of an AND gate 194 to the two inputs of which a frame reset pulse and a horizontal reset pulse are, respectively, connected. The generation and purpose of the horizontal reset pulse which is not present during the recording mode will be described hereinafter in connection with the operation of the playback circuit FIG. 2.

The frame reset pulse is derived, through pulse shaper 193, from the output of vertical sync separator 192 the input of which is connected to output 45' of sync separator 40. The frame reset pulse thus appears at the end of every line and it serves to keep the polarity reversing pulse in proper phase, notwithstanding the fact that each frame of a video signal of standard format contains an odd number of horizontal lines. The frame reset pulse, it may be added here, is produced both during the recording mode when switch 11 is in its REC position and during playback when this switch is in its PB position. Its function is to eliminate flicker due to the odd number of lines per frame, during reproduction of the picture on the color TV set.

The output 135 of modulator 125 is shown as waveform (g) in FIG. 3. Again, it is to be kept in mind that the partially encoded picture signal is present in the modulated signal (g) but is not shown here due to its unimportance in the synchronization scheme. Signals (g) and (h) are summed in adder 140, FIG. 1, to obtain the fully encoded video signal (i) having the desired synchronization pulses and bursts as shown in FIG. 3. The encoded picture information is shown in block form and the original horizontal sync pulses are present.

It has been found that by adding the pedestal-like indicating signal so as to raise the amplitude of alternate bursts into the picture level range as shown in waveform (i), much more reliable encoding can be obtained than if the inverted burst having an initial phase angle of 180° immediately follows the sync pulse at zero D.C. level. Signal (i) goes to a suitable recorder 145, FIG. 1, which may be magnetic or holographic, tape or disc type or of any other type known in the art.

FIG. 2 illustrates a decoding circuit corresponding to the encoding circuit of FIG. 1. The dashed lines labeled 310 enclose those components which comprise a decoder similar to that disclosed in FIG. 6 of the aforementioned copending application Ser. No. 571,706, filed on even date herewith-- except that comb filter 155 and delay device 165 have been added to make the showing more complete. Encoded video signal (i) is played back by recorder 145. Conventional comb filter 155 separates the luminance information Y and chrominance information D, providing the former on output line 160 and the latter on line 170. Luminance signal Y passes through time delay device 165 to an output 150. At the same time, sync separator 40, FIG. 1A, the input of which is connected to the output of recorder 145 via conductor 175 and switch 11 in its playback position PB, strips the horizontal sync information from signal (i) as played back by the recorder. This information is then used to drive divider-by-two 190 which reproduces the carrier $f_j$ at its output 130 which, as shown in the drawings, is also connected to an input of double balanced modulator 235, FIG. 2.

In order to be sure that reproduced carrier $f_j$ is in proper phase for demodulating chrominance signal D in double balanced modulator 235 even in the case of dropouts, apparatus is provided to reset the phase of divider 190 under the control of the horizontal sync pulses. This apparatus consists of a burst-flag-generator 200, a gate 210 and a low-pass filter 220. Waveform (a) of FIG. 3 is reproduced on line 45, FIG. 1A, and is fed into burst-flag- generator 200, FIG. 2, which is comparable to burst-flag-generator 50, FIG. 1, and provides pedestal-like indicating signal (c). The bottom input, FIG. 2, of gate 210 is connected to the chrominance output 170 of comb filter 155 and indicating signal (c) controls gate 210 in such a way that the output signal on line 215 of gate 210 comprises the sync signal of waveform (g), devoid of picture information. After filtering out the burst information with low-pass filter 220, waveform (j) is produced and this pulse is impressed on the horizontal reset input 225 of AND gate 194 to cause the output of divider 190 to be shifted into correct phase.

Double balanced modulator 235 performs the initial demodulation of encoded chrominance signal D when supplied with carrier $f_j$ in proper phase. The partially demodulated signal appearing on line 240 is filtered by low-pass filter 245 which provides chrominance signal R-Y at an output 250. Pedestal-like indicating signal (c) from burst-flag-generator 200 controls a second gate 275 so that the synchronization information of the signal on line 240 is given on line 280 as waveform (e). After appropriate bandpass filtering by filter 285, the burst information minus the D.C. (pedestal-like) component appears as waveform (d) on line 290. A phase-locked oscillator 295 reproduces carrier $f_k$ on line 300 in correct phase, the phase information being supplied to the oscillator by the $f_k$ frequency bursts of waveform (d). After filtering the signal on line 240, band-pass filter 255 provides the B-Y chrominance signal to double-balanced modulator 260 in modulated form. Modulator 260 serves to demodulate this signal in dependence upon the properly-phased carrier $f_k$. Lowpass filter 265 then provides chrominance signal B-Y at an output 270 in unmodulated form.

Components for effecting time-base error correction are also provided in the synchronized decoder circuit of FIG. 2. A crystal oscillator or other fixed-frequency oscillator 305 is set to give a constant frequency output signal, preferably at the carrier frequency $f_k$. The phase of carrier $f_k$ from phase-locked oscillator 295 is compared with that of the fixed-frequency signal in phase-comparator 310 and any phase difference between the two signals is reflected in a difference signal which is sent into a time-base error correction signal generator 315. From generator 315, a time-base error signal is provided on line 320. The time base error signal may be used as a reference REF to control the playback speed of recorder 145 or to control the delay afforded by a time delay element or bucket brigade used in further electronic time base error compensation circuitry not shown, for example, in the manner disclosed in copending application Ser. No. 437,285, of G. Rotter et al, filed Jan. 28, 1974, now U.S. Pat. No. 3,959,815.

It is to be noted that all components of the encoding and decoding circuits disclosed herein are conventional items well known to those skilled in the art. Although preferred embodiments of the present invention have been described in great detail in the foregoing discussion, it is to be understood that numerous modifications thereof will be apparent to those skilled in the art and that I do not intend to be limited to the specific circuits disclosed.

It should be noted, in particular, that while in the embodiment illustrated and described herein two modulation stages are used in tandem in the encoder, and similarly two demodulation stages in tandem in the decoder, the first chrominance signal R-Y--or rather the combination of both chrominance signals-- experiences in the second modulation stage a mere polarity reversal so that transmission of the first chrominance signal line-sequentially with alternating polarity is insured. However, as pointed out in the referenced continuation-in-part application, it is also possible, instead, to amplitude modulate the first chrominance signal R-Y on a carrier frequency--in a manner analogous to the amplitude modulation, in the embodiment shown herein, of the second chrominance signal B-Y on carrier frequency $f_k$, with the two carrier frequencies chosen so that the two modulated chrominance signals occur in non-overlapping regions of the frequency spectrum.

I claim:

1. In a color video signal processing system which includes separating and demodulating said color video signal into its component signals of luminance information and chrominance information; producing from said component signals an encoded signal having a bandwidth of not more than approximately 3MHz, such that one half of the sum of two successive horizontal scan lines of information equals the luminance information of the color video signal and one half of the difference of two successive horizontal scan lines of information equals the chrominance information of the color video signal, said chrominance information being represented by a first chrominance signal and a second chrominance signal which are contained in two non-overlapping frequency regions; and recombining the processed luminance and chrominance signals prior to transmitting or recording of the encoded signal, a synchronizing arrangement comprising the steps of:
    separating the horizontal sync signal from the color video signal;
    generating an indicating signal under the control of the separated horizontal sync signal;
    combining said indicating signal with each of said luminance and chrominance signals, and
    prior to said recombining of the processed luminance and chrominance signals, amplitude modulating at least one of the chrominance signals as combined with said indicating signal.

2. In a color video signal processing system the combination as claimed in claim 1 wherein said synchronizing arrangement comprises the steps of:
    separating the horizontal sync information from the received or played back signal; reproducing said indicating signal from said separated horizontal sync information; and amplitude-demodulating at least one chrominance signal under the at least partial control of said reproduced indicating signal.

3. In a color video signal processing system the combination as claimed in claim 1,
    wherein said indicating signal is an indicating pulse occurring separate from said horizontal sync signal, within the horizontal blanking interval;
    wherein said arrangement further comprises the step of supplying a carrier signal; and
    wherein said amplitude-modulating includes modulating said indicating pulse with said carrier signal, thereby to produce a burst-like signal.

4. In a color video signal processing system the combination as claimed in claim 3.

which comprises supplying a pulse which reverses its polarity in response to each horizontal sync pulse; and wherein said amplitude-modulating includes, as a first modulating step, modulating said second chrominance signal and said indicating pulse with said carrier signal, the frequency of said carrier signal being a multiple of the horizontal line frequency, and, as a second modulating step, modulating said first chrominance signal and said indicating pulse, with the product of said first modulating step added thereto, with said polarity reversing pulse.

5. In a color video signal processing system the combination as claimed in claim 4 wherein said synchronizing arrangement comprises the steps of:
separating the horizontal sync information from the received or played back signal;
reproducing said indicating pulse from said separated horizontal sync information;
amplitude-demodulating the chrominance information contained in the received or played back signal under the at least partial control of said reproduced indicating pulse;
gating the demodulation product of the last-mentioned step with said reproduced indicating signal to derive from said burst-like signal a phase-corrected carrier frequency;
deriving from said demodulation product said first chrominance signal; and
further demodulating said second chrominance signal as contained in said demodulation product with the aid of said phase-locked carrier frequency.

6. In a color video signal processing system the combination as claimed in claim 5 wherein said synchronizing arrangement comprises the further step of:
deriving from said phase-corrected carrier frequency a reference for time base error compensation of the played back signal.

7. In a color video signal processing system, apparatus comprising:
means separating the luminance information of the color video signal from the chrominance information of the color video signal;
means demodulating the chrominance information into a first chrominance signal and a second chrominance signal;
means processing the luminance information, first chrominance signal, and second chrominance signal to form an encoded signal such that one half the sum of two sequential horizontal scan lines of the encoded signal equals the luminance information of the color video signal and one half of the difference of the two sequential horizontal scan lines of the encoded signal equals the chrominance information of the color video signal, said chrominance information being represented by a first chrominance signal and a second chrominance signal which are contained in two non-overlapping frequency regions;
sync separator means separating the horizontal sync signal from the color video signal;
burst-flag-generator means generating an indicating signal under the control of the separated horizontal sync signal;
adder means combining said indicating signal with each of said luminance and chrominance signals;
modulator means, amplitude modulating at least one of said chrominance signals with said indicating signal; and
other adder means combining the processed luminance signal with the output of said modulator means, whereby said indicating signal is included in said encoded signal.

8. In a color video signal processing system the combination as claimed in claim 7, and
wherein there is further provided apparatus comprising:
sync separator means separating the horizontal sync information from the received or played back signal;
means including a burst-flag-generator which reproduces said indicating signal from said separated horizontal sync information; and
demodulating means amplitude-demodulating at least one chrominance signal under the at least partial control of said reproduced indicating signal.

9. In a color video signal processing system the combination as claimed in claim 7:
wherein said burst-flag-generator means include means inserting said indicating pulse between the trailing end of said horizontal sync signal and the trailing end of the blanking interval;
wherein said apparatus further comprises means supplying a carrier signal; and
wherein said modulator means includes a suppressed-carrier type modulator which modulates said indicating pulse with said carrier signal.

10. In a color video signal processing system the combination as claimed in claim 9:
wherein said apparatus comprises means supplying a pulse which reverses its polarity in response to each horizontal sync pulse;
wherein said modulator means includes a first suppressed-carrier type modulator which modulates said second chrominance signal and said indicating pulse with said carrier signal the frequency of which is a multiple of the line frequency, thereby to produce a burst-like signal;
wherein said apparatus further comprises a device adding the output of said first modulator to said first chrominance signal as combined with said indicating pulse; and
wherein said modulator means includes a second suppressed carrier type modulator which modulates the output of said device with said polarity reversing pulse.

11. In a color video signal processing system the combination as claimed in claim 10 wherein there is further provided apparatus comprising:
sync separator means separating the horizontal sync information from the received or played back signal;
means including a burst-flag-generator which reproduces said indicating signal from said separated horizontal sync information;
divider-by-two means which reproduce the polarity reversing pulse from said separated horizontal sync information;
circuit connections interposed between the output of said burst-flag-generator and said divider-by-two means to cause said divider-by-two means to be reset under the control of said indicating pulse, whereby the correct phase of said polarity reversing pulse is insured in case of dropout;

first demodulator means, amplitude-demodulating the chrominance information contained in the received or played back signal with the aid of said reproduced polarity reversing pulse;

gate means connected to the output of said demodulator to gate said output with said reproduced indicating signal;

phase-locked oscillator means connected to the output of said gate means to derive from said burst-like signal a phase-corrected carrier frequency;

first filter means also connected to the output of said phase-demodulator means to supply said first chrominance signal;

second demodulator means connected at their inputs to the output of said first demodulator means and to said phase-lock oscillator means, respectively; and second filter means connected to the output of said second demodulator means to supply said second chrominance signal.

12. In a color video signal processing system the combination as claimed in claim 11 wherein said apparatus further comprises:

other sync separator means separating the vertical sync information from the received or played back signal; and other circuit connections interposed between the output of said other sync separator means and said divider-by-two means to cause said divider-by-two means to be reset at the end of each line, whereby the correct phase of said polarity receiving pulse is insured even though each frame contains an odd number of lines.

13. In a color video processing system the combination as claimed in claim 11 wherein said apparatus further comprises:

oscillator means producing a fixed-frequency signal;

means comparing the phase of said fixed-frequency signal with the phase of said phase-corrected carrier frequency to provide a difference signal; and means producing a time base error correction signal in dependence upon the phase difference, as detected by said comparing means, between said fixed-frequency signal and said phase-corrected carrier frequency.

* * * * *